US006097335A

United States Patent [19]
Cassen et al.

[11] Patent Number: 6,097,335
[45] Date of Patent: Aug. 1, 2000

[54] TRANSMIT/RECEIVE MODULE HAVING MULTIPLE TRANSMIT/RECEIVE PATHS WITH SHARED CIRCUITRY

[75] Inventors: John W. Cassen, Sykesville, Md.; Stephanie A. Parks, Helston, United Kingdom; Edward L. Rich, III, Arnold, Md.; Gary N. Bonadies, Laurel, Md.; Gary L. Ferrell, Pasadena, Md.; John S. Fisher, Ellicott City, Md.; John W. Gipprich, Millersville, Md.; John D. Gornto, Columbia, Md.; Daniel J. Heffernan, Pasadena, Md.; David A. Herlihy, Ellicott City, Md.; Patrick K. Richard; David W. Strack, both of Baltimore, Md.; Scott K. Suko, Elkridge, Md.

[73] Assignee: Northrop Grumman Corporation, Los Angeles, Calif.

[21] Appl. No.: 09/456,330

[22] Filed: Dec. 8, 1999

Related U.S. Application Data

[63] Continuation of application No. 09/158,832, Sep. 23, 1998.

[51] Int. Cl.[7] ................................................ G01S 7/28
[52] U.S. Cl. ....................... 342/175; 342/81; 342/157; 342/371; 342/372
[58] Field of Search .................................. 342/175, 195, 342/74, 81, 83, 115, 153, 154, 157, 158, 368, 371, 372

[56] References Cited

U.S. PATENT DOCUMENTS

| 3,643,075 | 2/1972 | Hayes ........................................ 702/57 |
| 3,750,175 | 7/1973 | Lockerd et al. ......................... 342/371 |
| 3,818,386 | 6/1974 | Granberry ................................. 333/33 |
| 3,899,720 | 8/1975 | Peterson ................................... 361/804 |
| 4,806,937 | 2/1989 | Peil ......................................... 342/175 |
| 4,823,136 | 4/1989 | Nathanson et al. ..................... 342/368 |
| 4,870,421 | 9/1989 | Peil et al. ................................. 342/175 |
| 4,967,201 | 10/1990 | Rich, III ................................. 342/175 |
| 4,998,181 | 3/1991 | Haws et al. ............................. 361/702 |

(List continued on next page.)

OTHER PUBLICATIONS

"Microwave multichip modules using low cost microwave chip on flex packaging technology", McNulty, M.; Schnell, J.; Nixon, D., Multichip Modules and High Density Packaging, 1998. Proceedings. 1998 International Conference on, 1998 , pp:262–267.

"Technologies for miniaturisation of advanced spaceborne payloads", Arnold, J.; Jones, M.R.B., Electronics & Communication Engineering Journal vol. 4 3 , Jun. 1992, pp: 131–139.

"High density microwave packaging program phase 1–Texas Instruments/Martin Marietta team", Reddick, J.A., III; Peterson, R.K.; Lang, M.; Kritzler, W.R.; Piacente,P.; Komrumpf, W.P., Microwave Symposium Digest, 1995., IEEE MTT–S International, 1995 , Page(

"Ground connection soldering techniques of high density ceramics substrate of transmit/receive module and its reliability", Wang Tingyue; Cui Dianheng; Yu Shenlin; Tang Jun; Yan Wei, Electronics Manufacturing Technology Symposium, 1997., Twenty–First IEEE.

*Primary Examiner*—John B. Sotomayor

[57] ABSTRACT

A transmit/receive (T/R) module adapted for use in a radar system. The module has a unified structure including a layered substrate on and in which two T/R channel circuits are integrated. The channel circuits make use of power distribution, channel controller, and RF signal routing circuitry, partly on a channel shared basis. In the RF routing circuitry, respective coupler elements are employed to combine RF receive signals for output to an RF receive manifold and to split an RF transmit signal from a transmit manifold into separate RF transmit signals for input to the T/R channel circuits.

16 Claims, 9 Drawing Sheets

U.S. PATENT DOCUMENTS

| | | | |
|---|---|---|---|
| 5,140,333 | 8/1992 | Parker | 342/371 |
| 5,155,492 | 10/1992 | Hopwood et al. | 342/372 |
| 5,214,498 | 5/1993 | Lehman et al. | 257/678 |
| 5,225,841 | 7/1993 | Krikorian et al. | 342/204 |
| 5,264,860 | 11/1993 | Quan | 343/767 |
| 5,276,455 | 1/1994 | Fitzsimmons et al. | 343/777 |
| 5,339,083 | 8/1994 | Inami | 342/157 |
| 5,353,033 | 10/1994 | Newberg et al. | 342/375 |
| 5,382,175 | 1/1995 | Kunkel | 439/327 |
| 5,386,339 | 1/1995 | Polinski, Sr. | 361/719 |
| 5,404,148 | 4/1995 | Zwarts et al. | 343/776 |
| 5,412,414 | 5/1995 | Ast | 342/174 |
| 5,431,582 | 7/1995 | Carvalho et al. | 439/372 |
| 5,442,364 | 8/1995 | Lee et al. | 342/372 |
| 5,457,607 | 10/1995 | Carvalho | 361/470 |
| 5,539,415 | 7/1996 | Metzen et al. | 343/700 MS |
| 5,559,519 | 9/1996 | Fenner | 342/174 |
| 5,745,076 | 4/1998 | Turlington et al. | 342/372 |
| 5,854,610 | 12/1998 | Wojtowicz et al. | 342/372 |
| 5,861,845 | 1/1999 | Lee et al. | 342/375 |
| 5,940,031 | 8/1999 | Turlington et al. | 342/372 |

TRANSMIT/RECEIVE MODULE HAVING MULTIPLE TRANSMIT/RECEIVE PATHS WITH SHARED CIRCUITRY

CROSS REFERENCE TO RELATED APPLICATIONS

This application is a continuation of Ser. No. 09/158,832 filed Sep. 23, 1998.

This application is related to U.S. Ser. No. 09/158,829 (Northrop Grumman Docket No. BD-98-012) entitled, "A Dual Channel Microwave Transmit/Receive Module For An Active Aperture Of A Radar System", filed in the names of John W. Cassen et al on Sep. 23, 1998 now allowed; and U.S. Ser. No. 09/158,827 (Northrop Grumman Docket No. BD-98-111) entitled "Antenna Assembly Including Dual Channel Microwave Module", filed in the names of John W. Cassen et al on Sep. 23, 1998 now U.S. Pat. No. 6,005,531.

Both of these applications are assigned to the assignee of this invention and, moreover, are intended to be incorporated herein by reference.

BACKGROUND OF THE INVENTION

The present invention relates to transmit/receive apparatus for pulse radar systems and other microwave communications systems, and more particularly to electronic scan antenna arrays and transmit/receive circuit modules employed in such antenna arrays.

In a typical electronic scan antenna array (ESA) for a pulse radar system, numerous transmit/receive (T/R) circuit modules are arranged in a solid plane and connected to frontally located radiator elements which collectively generate a transmitted radar beam. The beam is normally energized, shaped and directed in azimuth and elevation under electronic control of the signals applied to the individual radiators. An ESA may have 2000 or more radiator elements.

Generally, a pulse radar system generates successive transmit pulses which are distributed through a transmit manifold and microwave circuitry to the various antenna radiators. Between transmit pulses, the radar system receives and processes successive return signals from the antenna radiators. The return signals are processed through microwave circuitry in the T/R module, collected through a receive manifold, and then processed in the system for target identification.

A T/R microwave circuit is normally associated with each antenna radiator. A microwave transmit circuit path operates on each transmit pulse received from the transmit manifold in an antenna transmit mode, and thereby controls the amplitude and phase of the radio frequency (RF) signal generated from the associated antenna radiator.

Inversely, in an antenna receive mode, a microwave receive circuit operates on each return RF signal from the associated radiator to control its amplitude and phase and pass it to the receive manifold.

Previously, transmit and receive circuits were embodied in separate modules, i.e., transmit modules and receive modules. In the current state of the pertaining art, the T/R microwave circuitry is usually embodied in a T/R module having a single T/R channel, i.e, an integrated unit in which various circuit elements are embodied to provide specified transmit and receive functioning for the T/R channel in the unit. The widely accepted modular T/R design approach generally results in reduced manufacturing costs and facilitates maintenance of installed ESA systems.

The pulse radar system employs a programmed digital processor to control amplification, attenuation, and phase shifting of transmit and receive signals, thereby determining the amplitude, direction, and shape of the aggregate RF energy beam transmitted by or received by the ESA. Different phase shifts cause different transmit or receive circuit delays in delivery of individual RF radiator signals to control the pattern with which spherical RF energy wavefronts associated with the different radiators are combined to define the direction and shape of a transmitted or received antenna beam. In the above referenced related patent application Ser. No. 09/158,829 (Docket BD-98-012), entitled A Dual Channel Microwave Transmit/Receive Module For an Active Aperture Of A Radar System, there is disclosed a T/R module having twin or multiple T/R channels for operation in an ESA array of a pulsed radar or other microwave communications system. The invention of the (BD-98-012) application provides better waste heat dissipation, higher RF power operation, and other performance improvements along with economies of manufacture.

The twin channels embodied in a twin T/R module of the referenced invention have substantially identical circuit paths, while sharing certain service circuitry, including power supply and distribution circuitry, logic and control circuitry, and RF signal routing circuitry. This application is directed to such circuit sharing and thus supports improvement in T/R module and microwave system performance along with manufacturing economy.

SUMMARY OF THE INVENTION

A multi-channel transmit/receive (T/R) module is provided for a microwave communications system. The module comprises a substrate having a DC/logic interface 36 for electrical connections to external logic control signals and a DC power supply, and having an RF interface 43 for RF connections to antenna radiators 25 and to transmit and receive manifolds. The substrate has multiple T/R channel circuits #1–#N formed integrally therewith. A system of shielded RF signal routing circuits is embodied in the substrate and interconnects the T/R channel circuits to the RF interface. A first circuit system is formed integrally with the substrate to provide controlled power distribution to active circuit components of the T/R channel circuits, and a second circuit system is formed integrally with the substrate to provide controlled operation of the T/R channel circuits.

These other circuit systems include common circuitry shared by at least two of the T/R channels in performance of module functioning.

Preferably, the RF signals routing circuit system includes a receive manifold circuit connected between a receive manifold terminal of the RF interface and respective RF signal receive path output junctions in the T/R channels. The receive manifold circuit includes a coupler which combines RF receive output signals from the T/R channel output junctions for application to the RF receive manifold terminal.

Preferably, a transmit manifold circuit is connected between a transmit manifold terminal of the RF interface and respective RF signal transmit path input junctions in the T/R channels. The transmit manifold circuit includes a splitter which divides a transmit manifold signal applied to the RF transmit manifold terminal for application of the divided RF transmit signals to the RF signal transmit input junctions in the T/R channels.

BRIEF DESCRIPTION OF THE DRAWINGS

The accompanying drawings, which are incorporated in and constitute a part of this specification, illustrate a preferred embodiment of the invention and together with the description, provide an explanation of the objects, advantages and principles of the invention. In the drawings.

DESCRIPTION OF THE INVENTION

Figure 1:
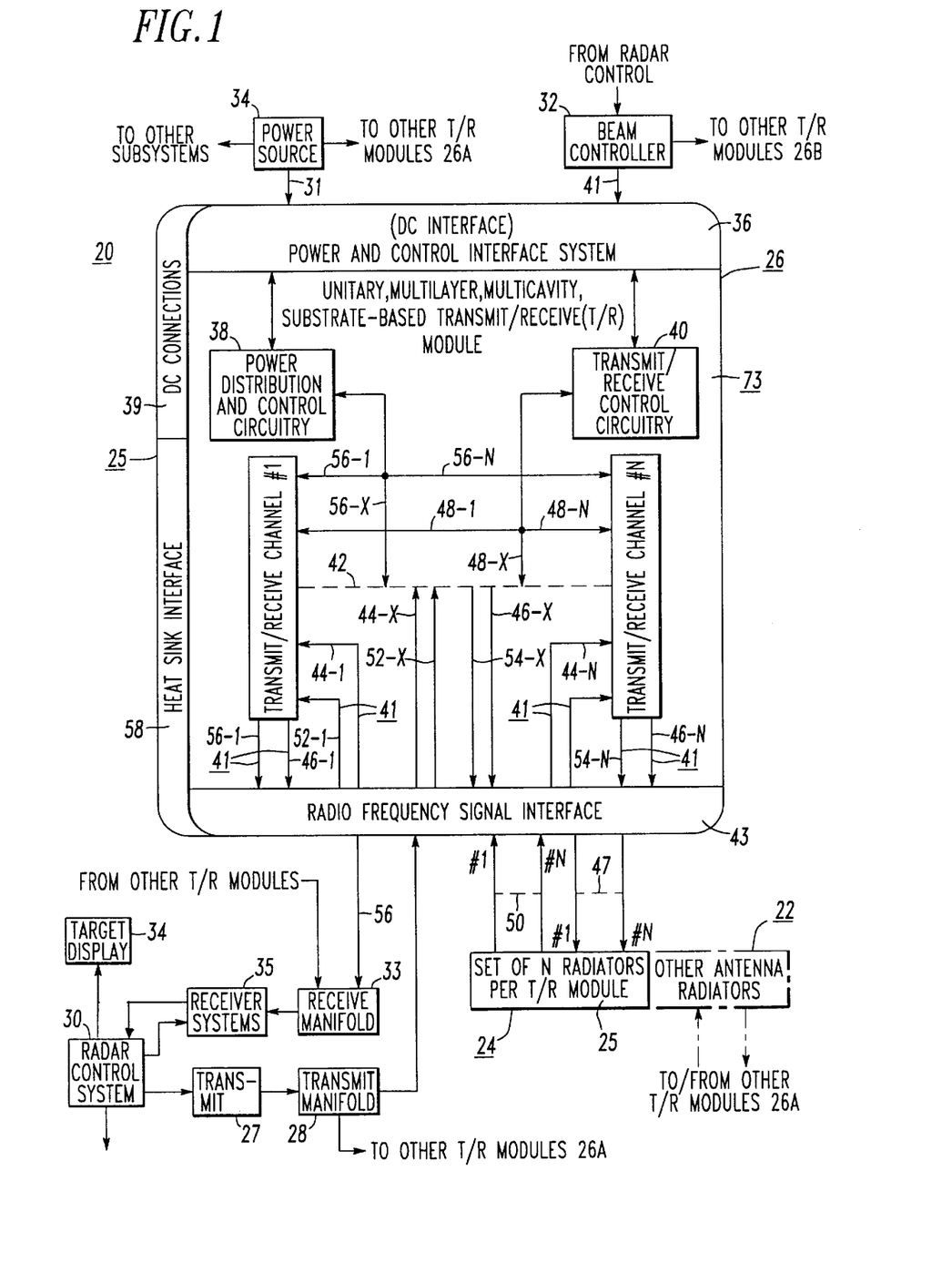
FIG. 1 is a schematic representation of a pulse radar system in which T/R modules are generally structured and operated in accordance with the invention.

In FIG. 1, a radar system 20 includes an ESA system 22 having a large number of microwave energy radiators 24. A T/R module 26 is a unitary, multilayer, multicavity, substrate-based unit which services a set of N radiators 25. Other identical T/R modules 26A service respective other sets of N radiators so that each T/R module function is associated with an antenna radiator. A substrate of the module 26 is indicated by the reference character 73.

With multichannel T/R modules, fewer modules need to be assembled and tested per application site thereby providing a first order of savings. In addition, multi-channel T/R modules can be structured for ease of module assembly and ease of assembly of the module into the antenna array. As a result of improved T/R circuitry architecture and improved layout architecture for such circuitry in a T/R module, the modular structure enables performance and cost improvements to be realized in an advanced T/R module which can be conveniently plugged into an ESA assembly while making electrical and heat sink connections simultaneously between the module and the assembly. Importantly, RF connections are made with high isolation, by shielding, and stability against vibration thereby supporting quality RF signal processing, and the heat sink connection is made with large surface contact area thereby supporting higher module waste heat dissipation, reduced rise in junction temperatures of module semiconductor devices, and higher module RF power capability.

In specifically embodying the T/R modules 26, 26A, the module circuitry preferably includes circuitry for a pair of T/R channels, i.e., N preferably equals two, thereby simultaneously achieving high product performance and improved product manufacturability through enhanced producibility with reduced cost.

With the existing state of pertaining technologies, the specific architecture of twin T/R channels per module is preferred since it is evaluated as currently optimizing the level of T/R integration into a unitary module. In the this module, existing production yields support a high first-pass yield, while higher integration levels would result in significantly higher rework requirements, such as where N=4, i.e., where four T/R channels would be integrated into a single T/R module. Among other values, the preferred twin channel module currently provides a favorable cost balance between reduced cost through a reduced need for T/R modules per ESA with higher T/R channel integration and increased cost through reduced T/R module yields associated with higher T/R channel integration.

T/R channels in a multi-channel T/R module can share T/R circuit components as more fully explained subsequently herein. Any failure in a shared component (such as a gate or drain regulator) results in an acceptable T/R channel failure rate per module failure in the case of the preferred twin channel module, whereas such a component failure would result in an undesirable T/R channel failure rate per module with adverse effects on antenna array reliability in multi-channel T/R modules having more than two T/R channels. Further, with the twin channel architecture, the size and number of components for the T/R channel circuitry are enabled to be reduced thereby resulting in more cost savings, higher reliability, and significantly reduced antenna array weight.

On the basis of the above and related considerations, the twin channel embodiment is rated as the best and preferred specific invention embodiment with use of available technology.

With reference again to FIG. 1, the radar system 20 uses a conventional transmit signal generator 27 and transmit manifold 28 to supply successive RF pulse signals to the T/R modules 26, 26A for radiation of microwave energy signals by the antenna radiators 24 in the antenna system 22. A conventional digital radar control system 30 controls the operation of the transmit signal generator 27.

A conventional beam controller processor 32 generates control signals for T/R module control of the phase and amplitude of the respective signals applied to the respective antenna radiators.

The antenna radiators also receive successive return microwave signals which are coupled to the T/R modules 26, 26A for phase shift and other processing and output through a receiver manifold 33 to a conventional receiver 35 for processing by the radar control 30 to detect return target signals for a target display 37.

An external power source 34 supplies power to the T/R modules 26, 26A over bus path 31, and to other subsystems of the radar system 20. Within the T/R module 26, a power and control interface system 36 receives power from the supply 34, provides a module integrated capacitor system for power storage which meets peak power demands, and transmits source and, as needed, capacitor stored power to power distribution and control circuitry 38 integrated in the T/R module 26.

Figure 3A:
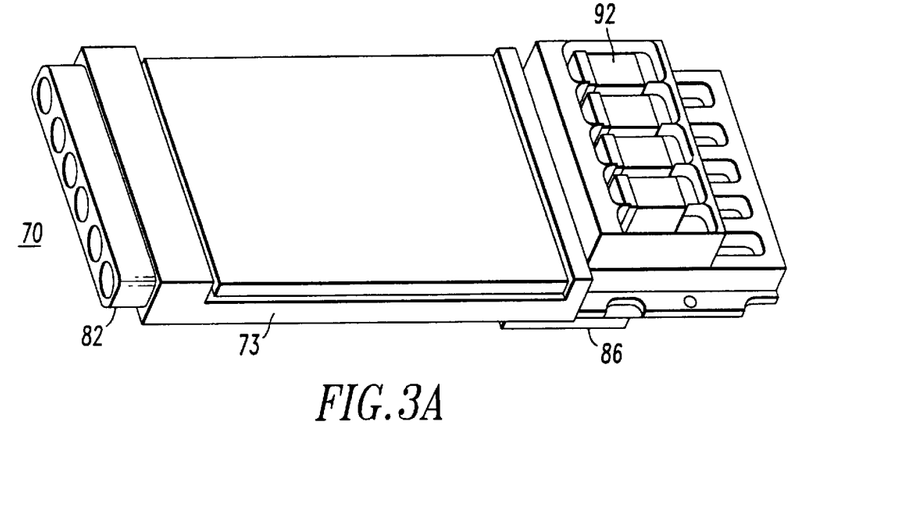
FIGS. 3A–3D provide a set of views providing an exterior overview of a preferred physical embodiment of the T/R module.
Figure 3B:
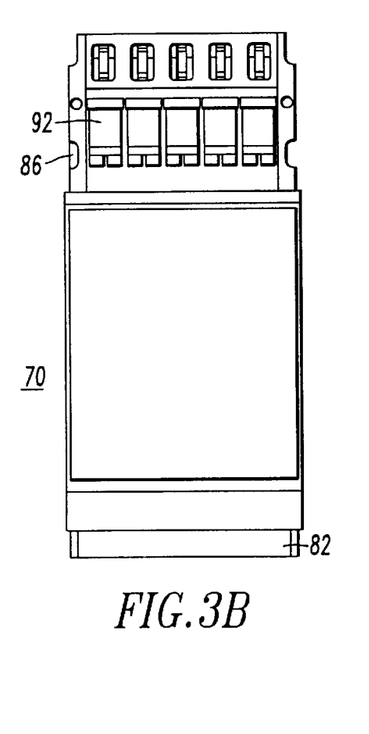
Figure 3C:
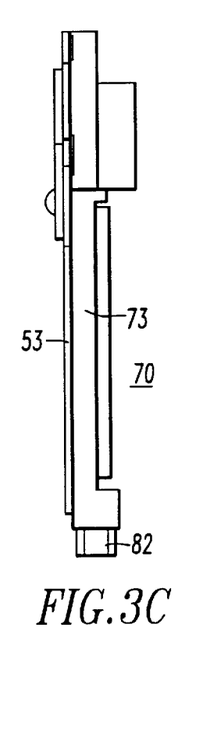
Figure 3D:
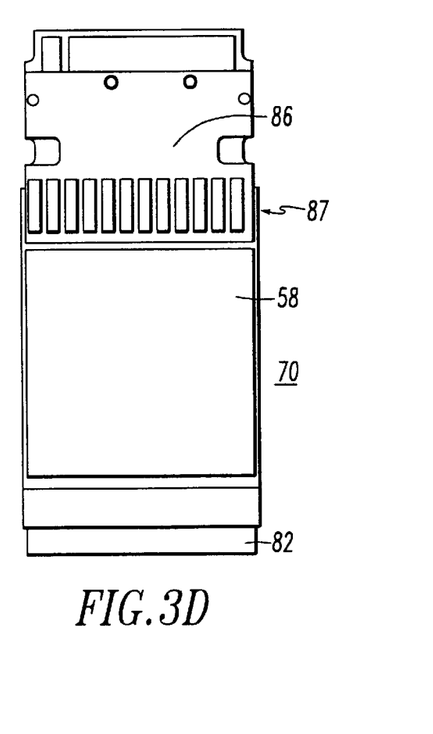
Figure 4:
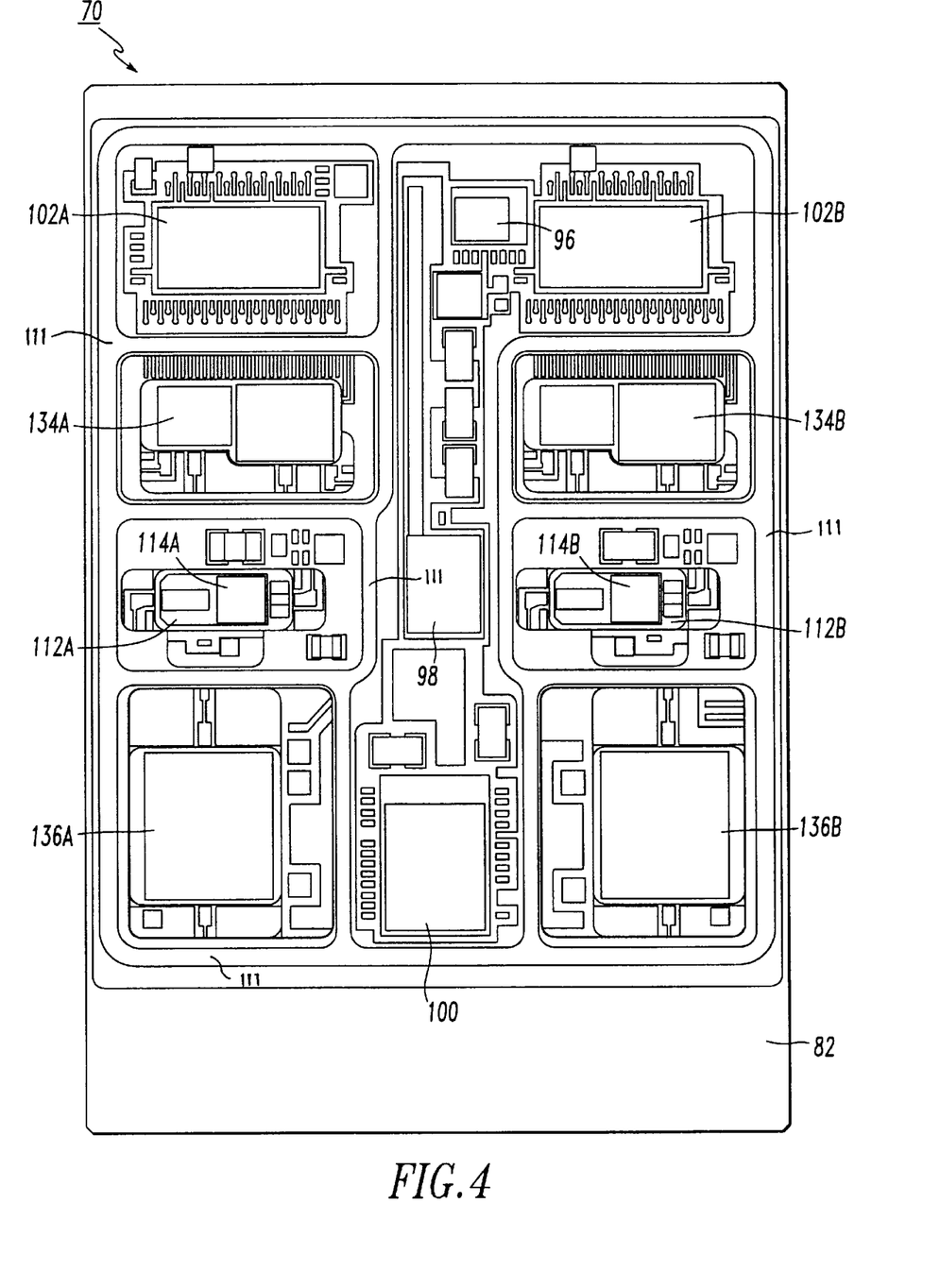
FIG. 4 is a top plan view showing the interior of the T/R module of FIGS. 3A–3D, with components of shared channel circuitry located in a centrally located column between left and right columns respectively containing components of first and second T/R channels of the T/R module.
Figure 5:
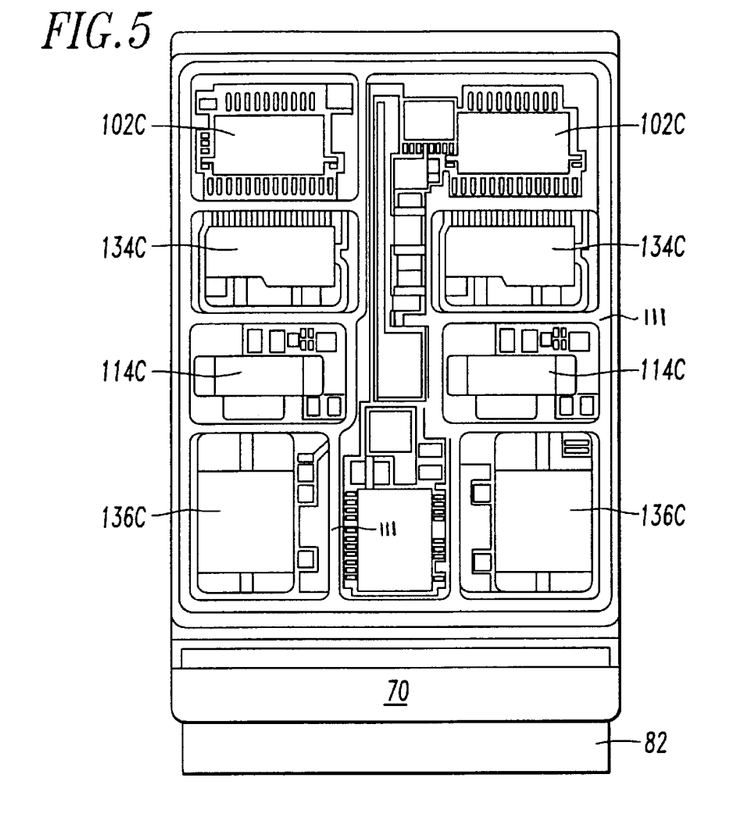
FIG. 5 is a view of the T/R module like the view of FIG. 4, with the components removed.

In a physical embodiment of the invention (FIGS. 3A–3D), a relatively short upper portion of a rear vertical side of the module 26, as indicated by the reference character 39 in FIG. 1, preferably provides a layout of spring connectors 87 (FIG. 3D) for connection to external DC power bus and external DC logic or control path terminals.

The T/R module 26 has the power and control or DC interface 36 located at a top end of the module thereby enabling the external power supply 34 to be connected to the DC interface through the external bus path 36 with relatively reduced bus path length. With a relatively short bus path length within the module 26, the overall connection length from the external power supply to the load point(s) within the module 26 is relatively minimized, thereby enabling reduced bus weight and higher RF power operation for the module 26.

As indicated by the reference character 41, the DC interface system 36 also receives DC logic or control signals from the beam controller 32 for transmission to transmit/receive control circuitry 40 which is integrally structured in the T/R module 26.

Transmit and receive channel circuitry, as integrally structured and operated in the T/R module 26 under control of the control circuitry 40, also supports improved T/R module and radar system performance with relatively reduced manufacturing cost and relatively better reliability in operation. The T/R module 26 has multiple T/R circuit channels #1 through #N. A dotted line 42 indicates T/R channels numbered between #1 and #N.

The invention can be embodied with multiple T/R channels in varying applications and with varying available technologies, but the number of T/R channels in the preferred specific embodiment is two, as previously explained. The multi-channel architecture contributes to improvements, including better T/R module and radar or microwave communications product performance with reduced manufacturing costs and greater operating reliability.

In an RF circuitry system 41 integrated in the module 26, RF transmit and receive signals are via an RF interface system 43 and applied to each integrated T/R channel as indicated by RF connections 44-1, 44-X, and 44-N. The RF interface system 43 is located on a bottom end of the module 26 to enable interfacing RF coaxial connections to be located as close as possible to antenna radiators and RF transmit and receive manifolds of the ESA system in which the module 26 is to be employed.

Figure 9:
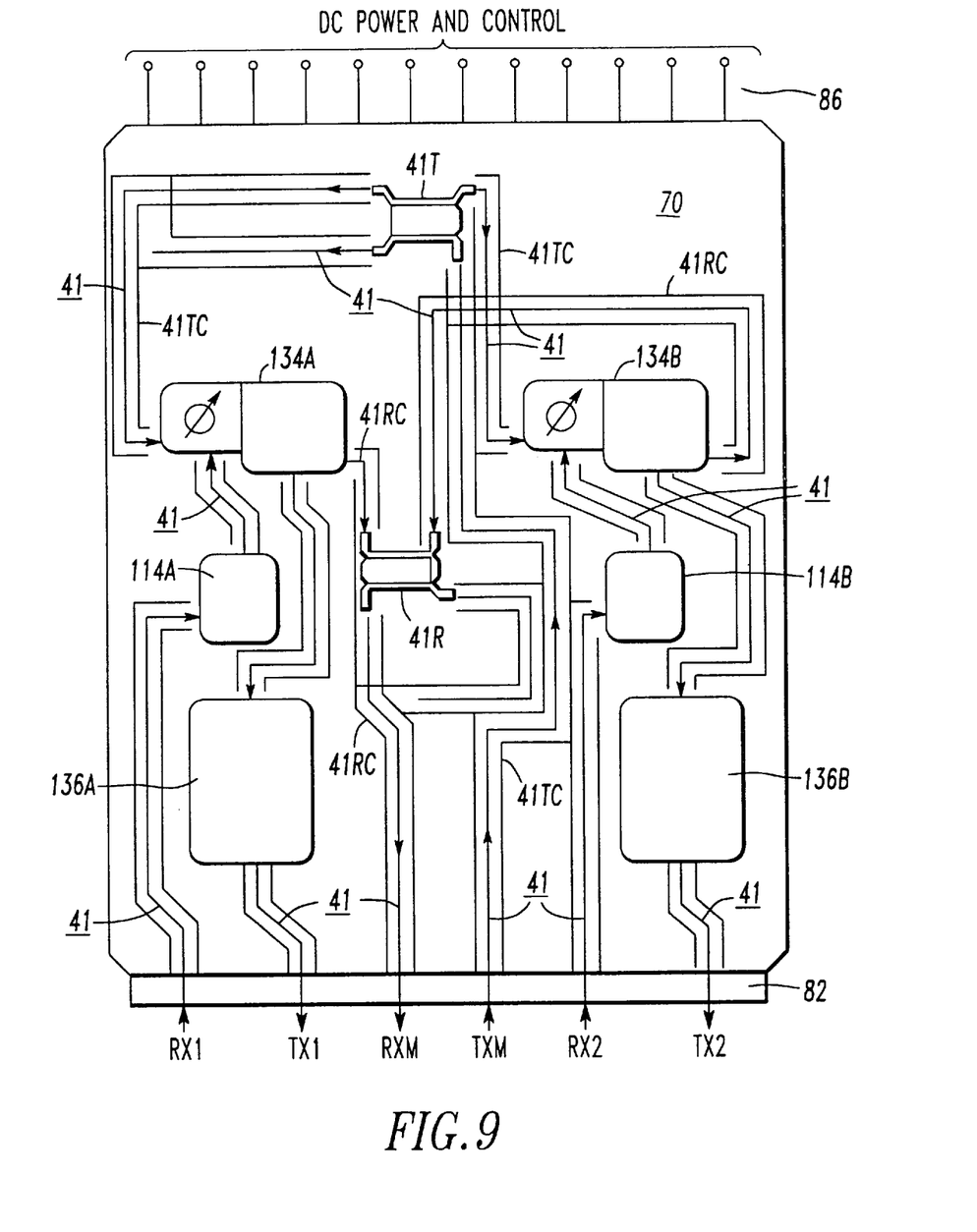
FIG. 9 schematically illustrates RF signal paths to and from the T/R channel circuitry.

With the RF interface 43 so located, internal module RF routing circuitry is arranged in accordance with basic circuit architecture, and embodied within the module 26 in accordance with a layout architecture which enables RF circuit interconnections to be established with minimum shielded RF path routing (i.e., from RF manifold and antenna inputs to T/R channel circuitry and from the latter to RF manifold and antenna outputs. FIG. 9 can be referred to for the RF circuit routing detail as preferably embodied in a physical embodiment of the module. The benefit obtained from minimal RF output routing is illustrated by the fact that about 1 to 2 dB of losses can be produced by each inch of RF routing from a power amplifier to the RF interface 43 through one or more module layers. Such a loss would drop the output RF power from 100% nominal to about 80% with use of alumina ceramic dielectric as substrate and layer material, or to about 63% with use of common black ceramic.

The T/R module 26 is thus characterized with a DC connection interface and an RF connection interface which are substantially separated from each other at opposite (top and bottom) module ends. Such structure leads both to improved module and system performance and to facilitated plug-in assembly of modules in an ESA structured to receive the modules.

Each T/R channel processes its input RF transmit signal and generates an output RF signal to the RF interface 43 as indicated by RF connections 46-1, 46-X, and 46-N. In turn, the output RF signals are respectively applied through RF connectors to the associated set of antenna radiators #1 through #N as indicated by reference character 47 for radiation as part of the system transmit beam.

The transmit/receive control circuitry 40 is structured to generate and send control signals and receive feedback signals to and from the T/R channels as indicated by connectors 48-1, 48-X, and 48-N. These control signals are used by the T/R channel circuitry to individualize the phase and amplitude of the transmit and receive signals according to system beam control specifications. The integrated, multi-channel module architecture enables better control signal processing and RF signal routing for improved product performance with reduced manufacturing cost and better operating reliability.

Each radiator of the antenna radiator set #1 through #N generates successive return RF signals which are coupled to the module RF signal interface system 43 as indicated by reference character 50. The return RF signals are applied to the T/R channels #1 through #N through RF circuit connections 52-1, 52-X, and 52-N for amplification and other processing. The T/R channels #1–#N apply processed return RF signals through RF connections 54-1, 54-X, and 54-N to the RF signal interface system 43 for coupling through RF connector 56 to the return signal processing system including units 33, 35, 30 and 34. The structure of the RF transmit and receive (return) circuitry as integrated in the T/R module 26 by the RF interface 43, the T/R channels #1–#N, and the various interconnections within the module provides increased RF channel isolation, reduced noise, and better product performance with relatively reduced manufacturing cost and higher operating reliability.

The power distribution and control circuitry 38 supplies power at different voltage levels according to power level and regulation needs of various circuit components included in the T/R channel circuitry. Single connection lines 56-1, 56-X, and 56-N represent separate integrated supply circuits used to supply the different voltage levels, as well as feedback circuits used to return signals needed by the power circuitry 38 for voltage regulation. The power circuitry 36 and the power and control interface system 36, including its peak power storage system, are structured and operated to supply power efficiently, according to module circuitry needs and at needed voltage levels, thereby reducing heat losses, supporting the operation of otherwise improved module-integrated circuitry, and, among other benefits, significantly reducing the weight of high current bus paths as compared to previous T/R modules.

The T/R module 26 enables semiconductor junction temperature rises to be reduced because of reduced heat generation and improved heat removal. The module 26 thus employs higher thermal efficiency to enable T/R modules to be structured and operated to provide higher RF output power.

Preferably, as shown schematically in FIG. 1, a heat sink layer 58 is integrally located across a large vertical portion of the rear vertically extending side 25 of the module 26, and extending substantially transversely between the RF interface 43 and the DC interface. In this manner, extensive heat sink surface area is made available for direct waste heat removal from heat generating components of the T/R channel circuitry.

The heat generating components of the module circuitry are thus all preferably directly integrally bonded to the heat sink layer 58 for greatly improved heat dissipation to an external heat sink which contacts the heat sink layer 58. The heat sink layer 58 preferably extends entirely across the rear module side 25, and substantially transversely upwardly from the bottom end of the module 26 where the RF interface is located. Power amplifier monolithic microwave integrated circuits (MMICS) of the two T/R channels can thus be integrated in the module 26 at a bottom module location where direct thermal contact is made to a heat sink for waste heat dissipation and where RF antenna output connections can be made over very short, shielded RF Connections with relatively little RF power loss.

Otherwise, because of the relatively extensive heat transfer surface available through the side-facing heat sink layer 58, other heat generating devices integrated in the T/R module 26 are also preferably directly bonded to the heat sink layer 58 at locations above the power amplifier MMICS. The circuit architecture and the architectural layout of the T/R module 26 thus operate together to improve product performance through better heat transfer, reduced rise in the temperatures of semiconductor junctions in internal circuitry of the multi-channel T/R module, and increased RF output power.

The modular layout of the DC and RF connector interfaces 36 and 43 and the heat sink layer 58 are basic factors which, among additional advantages, contribute to facilitated plug-in capability for the T/R module 26. In other words, the T/R module 26 simply and directly plugs into an ESA assembly such as shown and described in above-referenced related patent application Ser. No. 09/158,827 (Docket BD-98-111) entitled "Antenna Assembly Including Dual Channel Microwave Transmit/Receive Modules", and, in doing so, simultaneously and effectively makes all electrical and thermal connections to the ESA assembly, i.e., all RF connections through the bottom end of the T/R module 26, and DC connections through the top end of the T/R module 26, and a single but large-area heat transfer connection through the vertical side 25 of the T/R module 26. While simply made, these connections are nonetheless highly reliable and highly stable, and provide for improved module performance.

Figure 2:
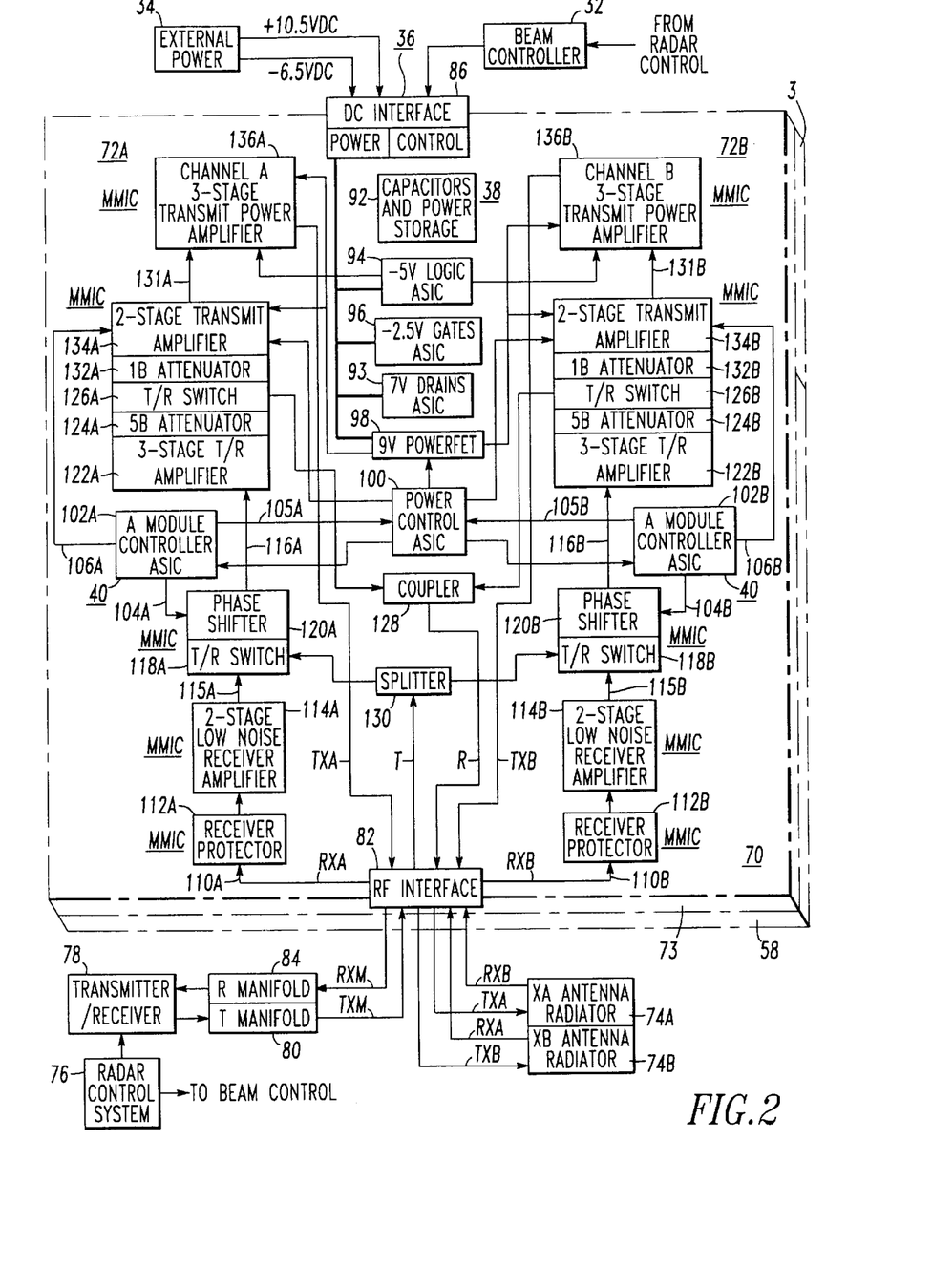
FIG. 2 schematically illustrates a preferred twin T/R channel Embodiment of the T/R module of FIG. 1, with internal electrical circuitry of the module and interfaced external system electrical circuitry in a block format.

In the preferred embodiment of FIG. 2, a twin T/R module 70 includes like transmit/receive channels 72A and 72B embodied in and on the substrate 73 respectively servicing antenna radiators 74A and 74B in a pulsed radar ESA. In some instances, reference characters for generic elements in FIG. 1 are applied in FIG. 2 to show correspondence between the two FIGURES. FIGS. 3A–3D are illustrative of perspective, side, and edge views of the preferred physical embodiment of the module 70. Similarly, generic reference characters are applied to FIGS. 4–9 and 10A–10D as appropriate.

In FIG. 2, a radar control system 76 operates a conventional transmitter/receiver 78 to generate transmit pulses through a conventional transmit manifold 80 to an RF interface 82 physically located at one end of the T/R module 70.

The T/R channels 72A and 72B phase shift, amplify, and otherwise process transmit pulses within the module 70, under beam control, and apply the respective processed pulses to the antenna radiators 74A and 74B through the RF interface 82.

The antenna radiators 74A and 74B receive return RF signals from the radar field of view, and apply these RF signals to the RF interface 82 for circuit processing, under beam control, by the T/R channels 72A and 72B within the module 70. After processing, the return signals are output through the RF interface 82 to a conventional receive manifold 84 for input to the transmitter/receiver 78. The return signals are then processed for target detection and display under control of the system 76.

A number of factors characterize the module 70 with significantly improved RF performance. These factors include layout of RF isolation cavities and RF components within the T/R module 70 (FIGS. 4 and 5), relatively short two-dimensional and three-dimensional shielded RF circuit routing for connecting integrally embedded or bonded components in each T/R channel path and for connecting the T/R channel paths to the RF interface 82 (FIG. 9), module embedded coupling of processed return RF signals for receiver manifold input, module embedded splitting of transmitter manifold RF signal for input to transmit processing paths of the separate T/R channels 72A and 72B, and the placement and structure of the RF interface 82. Thermal performance of the T/R module is another important factor in improved RF performance, since overall heat generation is reduced and waste module heat is more effectively removed thereby directly restricting semiconductor junction temperatures and enabling higher RF output power operation.

It should be understood that FIG. 2 is a schematic representation of circuitry on a schematically represented physical module, and the order of circuit components in the respective T/R channels 72A and 72B corresponds to the electrical circuit order of such components. The actual physical ordering (FIG. 4) of the circuit components on the module is different from the schematic component ordering in FIG. 2. For example, channel power amplifiers are actually located near the RF interface end of the module, whereas the power amplifiers are shown at the DC interface end of the module in FIG. 2.

The RF interface 82 enables RF signals to be isolated substantially from DC power and control signals which are applied to the module 70 through a DC interface 86 at a module end 87 located oppositely from the RF interface end of the module 70.

Figure 6:
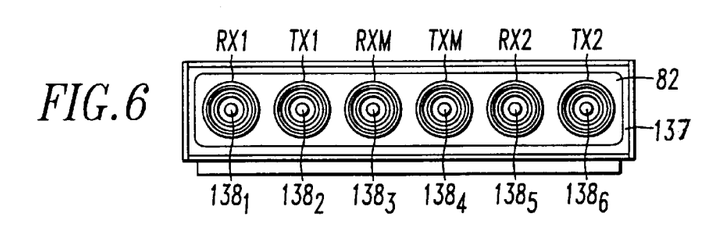
FIG. 6 is an end view of the module of FIG. 5, showing an RF interface having connectors for making external RF connections for the module channel circuitry.
Figure 7:
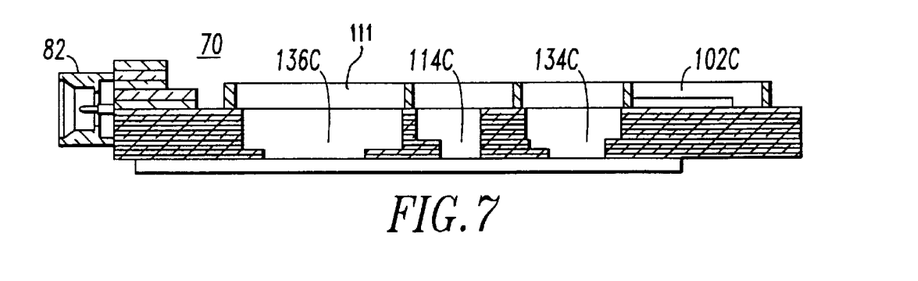
FIG. 7 is a cross-sectional view of the T/R module taken along reference line VII—VII of FIG. 5.

As noted previously, with such RF connectors, the module 70 conveniently plugs into an ESA antenna system to establish all required RF connections during installation or replacement. In addition, only six RF external connectors RX1, TX1, RXM, TXM, RX2, TX2 as shown in FIG. 6 are required for eight RF connections which must be made to the twin T/R channels, since only one RF connector is needed for each manifold connection to the two channels.

The DC interface 86 employs the previously referenced spring clip connectors 87 (FIG. 3D) for external DC power and DC control signal connections, as more fully described in the incorporated patent application BD-98-012. In this case, an external power source 90 supplies power to the DC interface 86 at +10.5 VDC for application to a capacitor power storage system 92 and for application to a unit 93 for drain power distribution and a powerfet unit 98 for amplifier power distribution. The power source also supplies power at −6.5 VDC for distribution to a −5V logic supply 94, and a −2.5 VDC gate supply 96, in correspondence to block 38 in FIG. 1, which, in turn apply the negative voltages to various semiconductor elements within the module 70.

In operation, the T/R channels 72A and 72B share the stored power capacitor system 92 and the units 93, 94, 96, and 98. The negative voltage supplies 94 and 96 operate both negative logic power amplifier enabling circuitry, and power amplifier gate bias, thereby providing a safety interlock to provide module operation.

A shared power control 100, with correspondence to the block 38 of FIG. 1, regulates the powerfet 98 in accordance with higher level (module controller) commands.

Control circuitry of the T/R module corresponds to the block 40 of FIG. 1, and passes beam control signals from the DC interface 86 to a module controller system, preferably embodied in this case by a pair of separate module controllers 102A and 102B respectively providing phase and amplitude control over RF transmit and receive signals in the respective T/R channels 72A and 72B (see arrows 104A, 105A, 106A, and 104B, 105B, 106B). In addition, the module controllers 102A and 102B preferably operate on a limited basis of shared module control by providing crossover channel control by one of the module controllers in the event the other module controller fails. Further, either module controller will shut down the entire module upon the occurrence of certain detected conditions, in order to prevent faulty module operation from adversely affecting the accuracy of overall beam control. However, by providing a separate controller for each T/R channel, control circuit connections are reduces in complexity and in length thereby enhancing reliability and manufacturing economy.

Each of the power and control system operating units 93, 94, 96, 100, 102A, and 102B is preferably embodied as an application specific integrated circuit (ASIC). The capacitor system 92 is preferably a subassembly of four relatively large, power storage capacitors and a smaller ripple filter capacitor, with the subassembly arranged as an integral, "on-board" part of the T/R module 70.

The two T/R channels 72A and 72B are essentially identical, and corresponding reference characters will be used for the two channels, but only the channel 72A will be described. Each circuit component in each T/R channel is preferably embodied as a monolithic microwave integrated circuit (MMIC). Each MMIC is shown as a separate block in FIG. 2, and separately executed functions within each MMIC are designated within sub-blocks in the overall MMIC blocks.

In a receive path 110A, a receive antenna signal RXA is obtained through shielded RF routing circuitry from the RF interface 82, and applied to a receiver protector 112A and then to a 2-stage low noise receive amplifier (LNA) 114A. The LNA output is applied to a shared transmit(T)/receive (R) channel path 116A for further processing.

In the shared T and R path 116A, a TR switch 118A operates in its receive mode and passes the LNA signal to a phase shifter 120A which operates in accordance with control signal from the module controller 102A. The phase shifted signal is applied to a 3-stage T/R amplifier 122A, and thereafter to a 5-bit attenuator 124A and a TR switch 126A at the end of the shared T/R channel path 116A.

The T/R switch 126A operates in its receive mode and passes the amplified/attenuated/phase shifted receive signal through shielded RF circuitry in the layered structure of the module to a coupler 128. The coupler 128 receives another receive signal from the T/R switch 126B in T/R channel 72B and couples it with the receive signal from the T/R switch 126A in the T/R channel 72A. The coupled signals are transmitted through shielded RF circuitry to RF terminal RXM (FIG. 6) in the RF interface 82 for transmission to the RF manifold 84.

In the transmit mode of operation, the T/R switch 118A switches to its transmit mode to pass a transmit signal received from a signal splitter 130. The transmit manifold 80 transmits a signal T (FIG. 2) through terminal TXM (FIG. 6) of the RF interface 82 to the splitter 130 where it is split for application to the T/R switch 118A and to the T/R switch 118B.

In the shared T/R channel path 116A, the transmit signal is phase shifted by the phase shifter 120A and then amplified by the amplifier 122A and attenuated by the attenuator 124A. As thus processed, the transmit signal is next passed by the T/R switch 126A in its transmit mode to a transmit channel path 131A the T/R channel 72A. In the transmit path 131A, the transmit signal is processed by a 1-bit attenuator 132A and thereafter a 2-stage transmit amplifier 134A. Finally, a 3-stage transmit power amplifier 136A operates on the transmit signal to generate an RF output signal.

The RF output signals from the two channel power amplifiers 136A and 136B are respectively routed through shielded RF paths to RF output connectors TX1 and TX2 (FIG. 6) for application to the antenna radiators 74A and 74B (FIG. 2).

Figure 8:
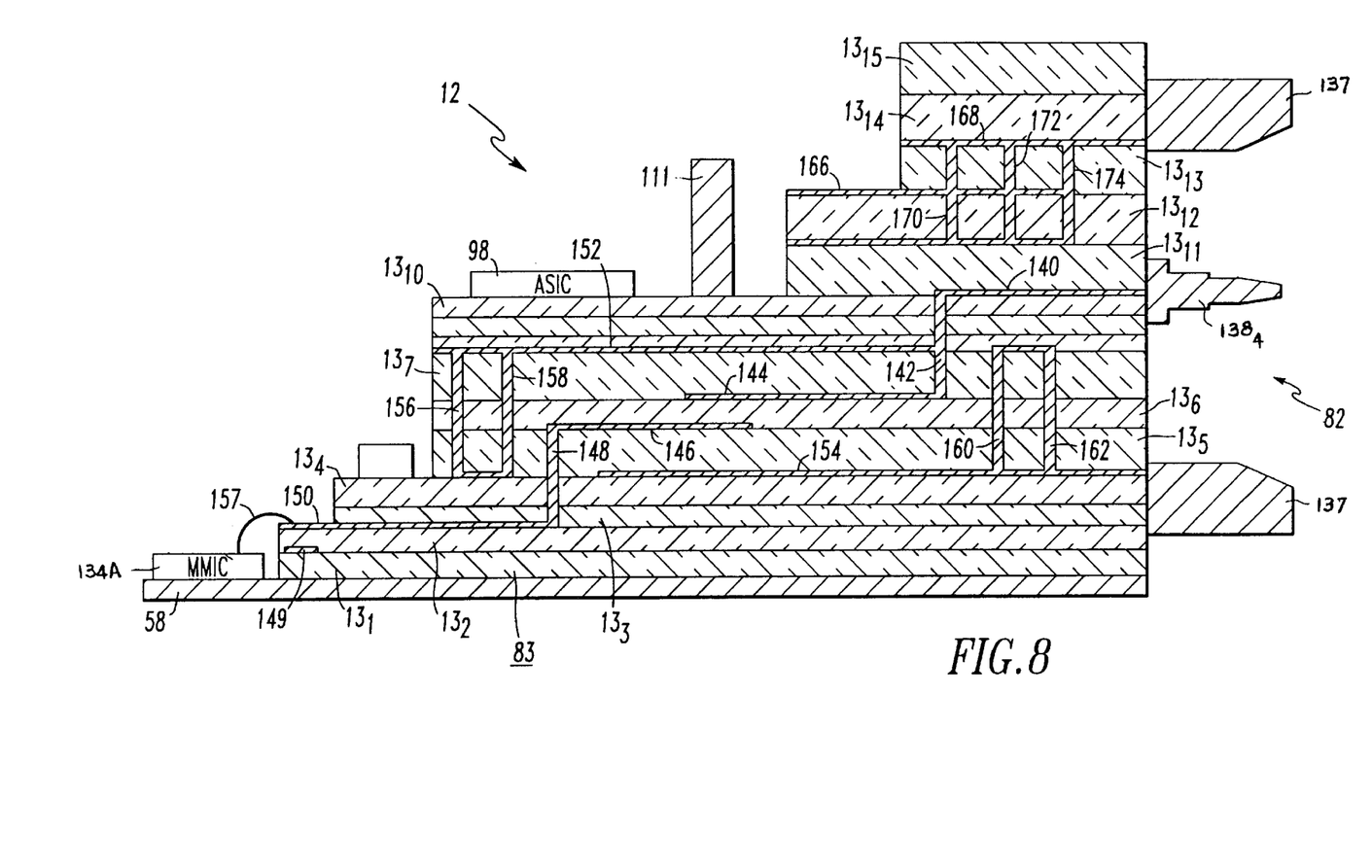
FIG. 8 is a diagram illustrating HTCC ceramic layers toward the RF interface end of the T/R module, along with ground and signal vias forming RF shielded signal routing three-dimensionally through certain layers and between connection points.

As shown in FIG. 8, RF signals enter and leave the module 10 through the connector assembly 43 which includes six like RF coaxial connectors $134_1 \ldots 134_6$. These connectors include pins $138_1 \ldots 138_6$, arranged linearly (FIG. 6) within and across the shroud member 137.

In FIG. 8, the connector pin $138_4$ is shown connected to a stripline conductor 140 on the top of the HTCC layer $13_{10}$. Stripline conductor 140 extends inwardly where it connects to a vertical via 142 which descends to a length of stripline conductor 144 on the top of layer $13_6$. Immediately below conductor 144 on top of layer $13_5$ is a length of stripline conductor 146 which extends under conductor 144. Such an arrangement permits RF coupling between a conductor 144 and 146, thereby completing an RF path from MIMIC 134A to the output pin $138_4$. The RF coupling in the path illustrates the concept employed in providing RF coupling in the two manifold couplers 128 and 130 shown in FIG. 2. One of the manifold couplers 130 acts as a signal splitter and the other coupler 128 acts as a signal combiner. These manifold couplers are embedded in the substrate 12 and are more fully shown and described with respect to FIGS. 10B and 10D.

A stripline conductor element 149 which acts as a capacitive stub is also shown located on the top of layer $13_1$ directly beneath the bond wire connection of member 151 to conductor 150. Isolation and shielding for the RF coupler configured by stripline conductors 144 and 146 are further provided by upper and lower ground planes 152 and 154 including pairs of vertical vias 156, 158 and 162 terminating the top of layers $13_4$ and $13_7$, respectively.

The module layers 135 (FIGS. 10A and 10B) and $13_6$ (FIGS. 10C and 10D) include specific patterns of conductors and vias, and also implement a pair of RF signal couplers 320 and 322 which correspond to the signal coupler 128 and signal splitter 130 of FIG. 2 and which connect to both T/R channels and which results in eliminating two relatively expensive GPPO manifold connectors.

Figure 10A:
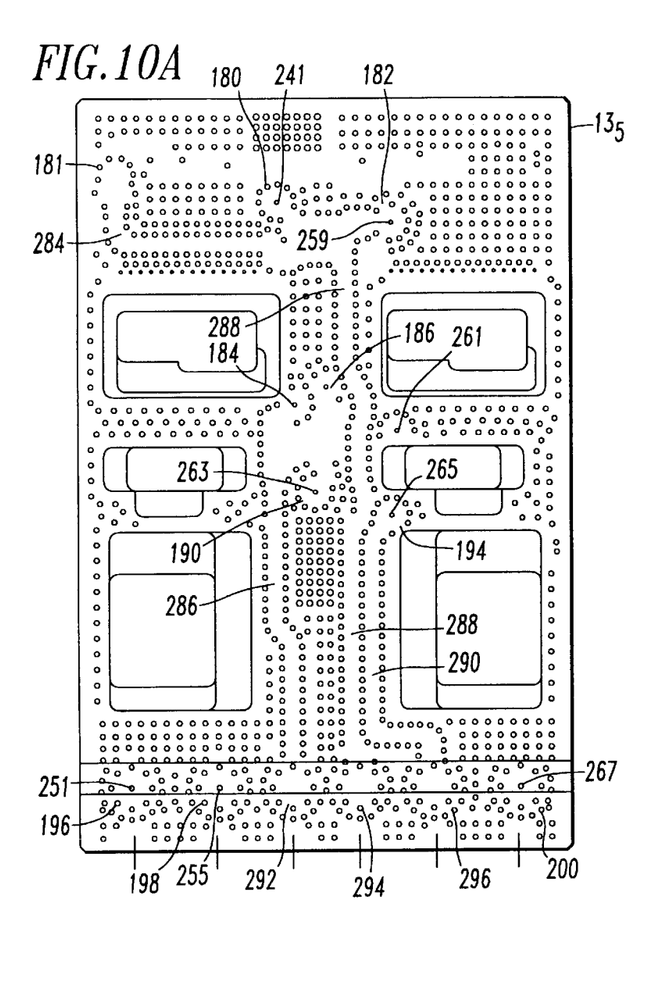
FIGS. 10A–10D illustrate respective via and top metallization patterns formed for module layers 5 and 6 shown in FIG. 8, enabling receive signals to be coupled together for application to an external receive manifold, and enabling a transmit signal from an external transmit manifold to be split into two signals for application to the respective T/R channels for amplification and output for antenna radiation.
Figure 10B:
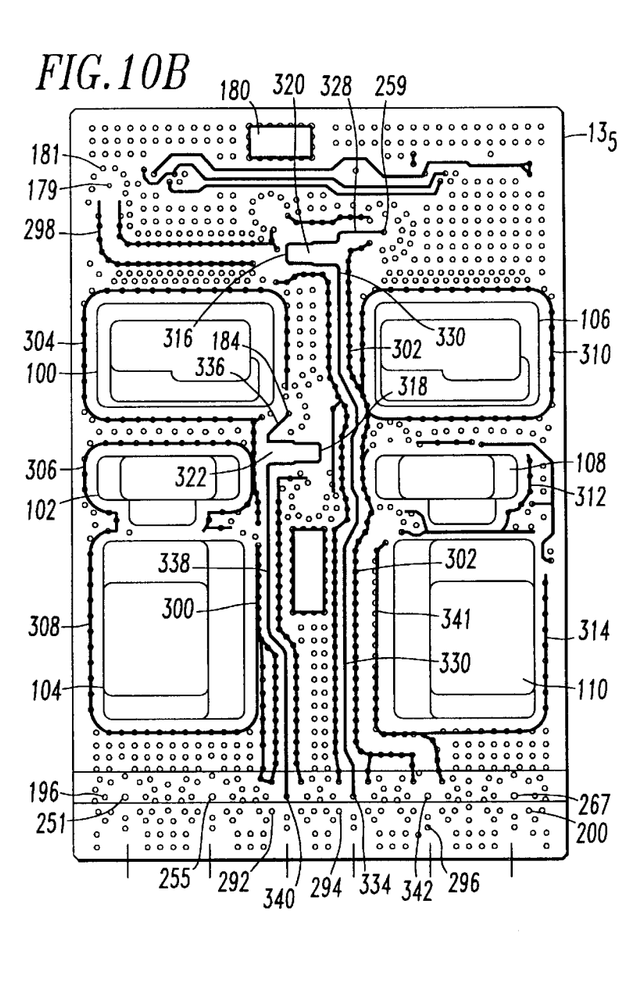

In the fifth HTCC layer $13_5$ as shown in FIGS. 10A and 10B, a vertical via and stripline pattern includes, inter alia, circular via patterns 180, 181, 182 . . . 198, 200, and also parallel line pairs of vias 284, 286, 288, and 290, with pairs 286, 288 and 290 terminating in respective additionally circular via patterns 292, 294 and 296 located at the RF connector end of the substrate.

With respect to the metallization pattern on the top surface of layer $13_5$, as shown in FIG. 10B, it includes pairs of parallel stripline shield conductors 298, 300 and 302 over the parallel lines of vias 284, 286 and 288 shown in FIG. 10A. Also, shielding striplines 304, 306 . . . 312, 314 are formed around the openings for cavities in the substrate.

Figure 10C:
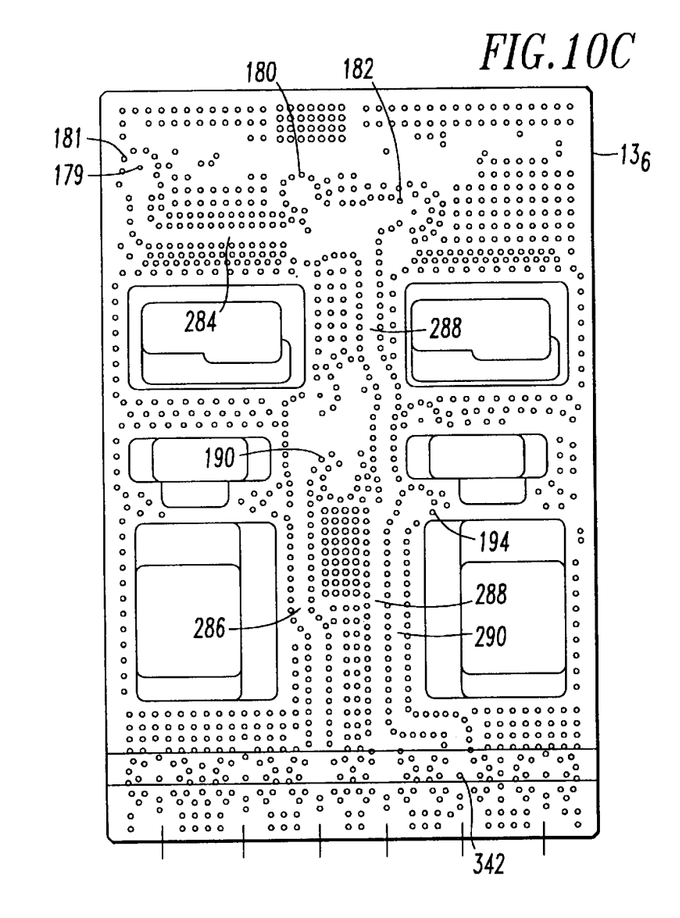
Figure 10D:
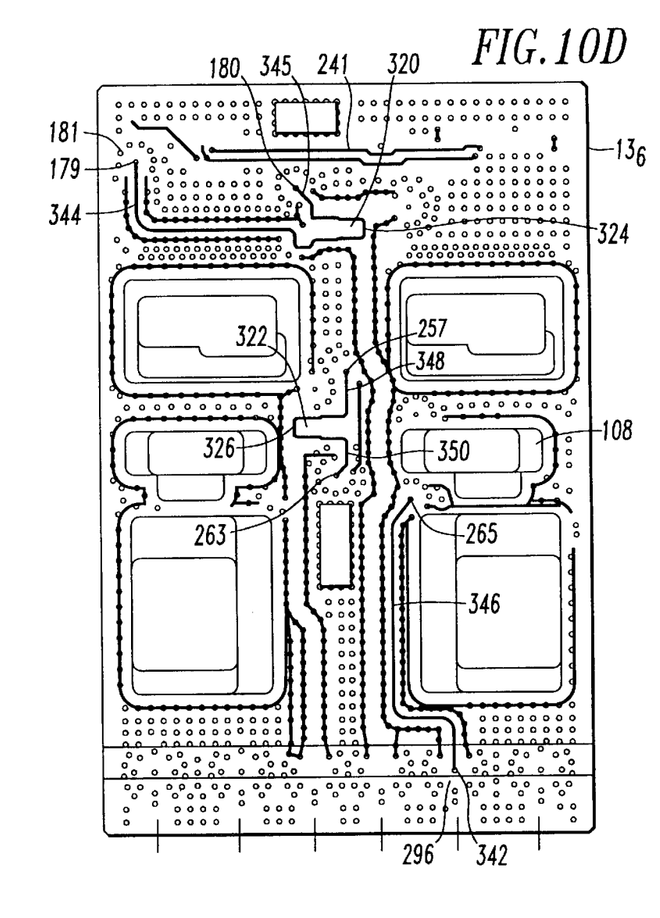

Centrally located on layer 13₅ are two underlying stripline segments 316 and 318 of two manifold couplers, one a transmit manifold coupler (splitter) 320, and the other a receive manifold coupler 322, whose respective overlaying stripline segments are shown by reference numerals 324 and 326 in FIG. 10D (layer 13₆). One side of transmit manifold splitter segment 316 is connected to conductor 328 and via 259, while the opposite side connects to an elongated conductor 330 which passes through conductor pair 302 to a vertical via 334 in the circular via pattern 294 and which connects to RF connector TXM (FIG. 6).

One side of receive manifold coupler segment 322 connects to conductor 336 and via 184 while the opposite side thereof connects to an elongated conductor 338 which passes through conductor pair 300 to a vertical via 340 in circular via pattern 292 and which then connects to RF connector RXM in FIG. 6. FIG. 10A also depicts a shield conductor pair 340 which mutually shares a conductor with adjacent shield conductor pair 302. A vertical via 342 is also now provided in circular via pattern 296.

The via pattern of layer 13₆ illustrated in FIG. 10C is similar to that in the underlying layer 13₅ shown in FIG. 10A. The stripline conductor pattern on the top surface of layer 13₆ again operates as shielding for the underlying RF conductors 300 and 330 shown in FIG. 10B as well as an RF conductor line 344 connected between via 179 and one side of transmit manifold splitter segment 324. An RF conductor line 346 for the received signal (RX2) of the second T/R channel is connected between vertical via 265 and vertical via 342 in circular via pattern 296 at the RF connector end of the substrate 12. Further as shown in FIG. 10D, one side of receive manifold coupler segment 322 connects to conductor 348 and via 257, while the other side connects to conductor 350 and via 263.

Thus, layers 13₅ and 13₆ which overlay a ground plane metallization of layer 13₄ comprise a second level of RF routing which is primarily used for routing RF signals to and from the manifold couplers 320 and 322; however, as noted above, layer 13₆ also routes the RF receive signal from the antenna array and connector assembly 82 (FIG. 6) to a low noise amplifier.

The foregoing description of the preferred embodiment has been presented to illustrate the invention without intent to be exhaustive or to limit the invention to the form disclosed. In applying the invention, modifications and variations can be made by those skilled in the pertaining art without departing from the scope and spirit of the invention. It is intended that the scope of the invention be defined by the claims appended hereto, and their equivalents.

What is claimed is:

1. A multi-channel transmit/receive (T/R) module for a microwave signal system including a radar system having an active aperture, the module comprising:

a substrate;

the substrate having a DC interface for electrical connections to a source of logic control signals and a source of DC power;

the substrate having an RF interface for RF connections to antenna radiators and to transmit and receive manifolds;

the substrate having multiple isolated T/R channel circuits formed integrally therewith;

the T/R channel circuits including active circuit components;

a system of shielded RF signal routing circuits embodied in the substrate and interconnecting the T/R channel circuits to the RF interface;

a first circuit formed integrally with the substrate providing power distribution to the active circuit components of the T/R channel circuits;

a second circuit formed integrally with the substrate providing operation of the T/R channel circuits; and at least one of the first and second circuits having common circuitry shared by at least two of the T/R channels in performance of functioning provided by the common circuitry.

2. The module of claim 1 wherein said at least one circuit comprises the first circuit, the first circuit having separate units for outputting DC voltages at levels required for different active circuit components of the T/R channels.

3. The module of claim 2 wherein negative voltage is utilized for both negative logic transmit enabling and power amplifier gate bias, thereby providing a mutual interlock against enabling a power amplifier of said active circuit components without a negative gate bias.

4. The module of claim 1 wherein said at least one circuit comprises the first circuit, the first circuit including a capacitor assembly formed integrally with the substrate, connected with the DC interface to receive power for storage, and supplying DC power to the first circuit for distribution to active components of the T/R channels according to load demand.

5. The module of claim 1 wherein the RF interface and the DC interface are located at opposite ends of the substrate.

6. The module of claim 5 additionally including, a heat sink plate located on an outer side of the substrate between the RF and DC interfaces.

7. The module of claim 6 wherein the substrate includes a plurality of cavities and wherein selected active components of said active components are located in respective cavities and thermally coupled to the heat sink plate for waste heat dissipation.

8. The module of claim 1 wherein the second circuit includes a separate module controller generating control signals for each T/R channel, the DC interface being coupled to the module controllers to supply control signals to said active circuit components defining certain control actions including phase shifting, amplification, and attenuation of RF signals processed by the T/R channels.

9. The module of claim 1 wherein said multiple isolated T/R channel circuits comprises a pair of T/R channel circuits.

10. A multi-channel transmit/receive (T/R) module for a radar system including an active aperture, the module comprising:

a substrate;

the substrate having a DC interface for electrical connections to a source of logic control signals and a source of DC power;

the substrate having an RF interface for RF connections to antenna radiators and to transmit and receive manifolds;

the substrate having a plurality of T/R signal channels formed integrally therewith;

a system of shielded RF signal routing circuits embodied in the substrate and interconnecting the T/R signal channels to the RF interface;

the RF signals routing circuit system including a receive manifold circuit connected between a receive manifold terminal of the RF interface and respective RF signal receive path output junctions in the T/R signal channels;

the receive manifold circuit including a coupler which combines RF receive output signals from the T/R channel output junctions for application to the RF receive manifold terminal;

a transmit manifold circuit connected between a transmit manifold terminal of the RF interface and respective RF signal transmit path input junctions in the T/R channels; and the transmit manifold circuit including a splitter which divides a transmit manifold signal applied to the RF transmit manifold terminal for application of the divided RF transmit signals to the RF signal transmit input junctions in the T/R channels.

11. The module of claim 10 wherein the substrate comprises a layered structure, and the coupler and the splitter are embodied within layers of the substrate.

12. The module of claim 10 wherein the T/R signal channels include active circuit components and wherein a first circuit is formed integrally with the substrate to provide controlled power distribution to the active circuit components of the T/R signal channels;

a second circuit is formed integrally with the substrate to provide controlled operation of the T/R signal channels; and at least one of the first and second circuits having common circuitry shared by at least two of the T/R signal channels in performance of functioning provided by the common circuitry.

13. The module of claim 12 wherein a capacitor assembly is mated with the substrate and connected with the DC interface to receive power for storage, said capacitor assembly supplying DC power on a channel shared basis for power distribution to the active components of the T/R signal channels according to load demand.

14. The module of claim 10 wherein the RF interface is formed at one end of the substrate and the substrate extends substantially transversely from the RF interface toward the DC interface, additionally including a heat sink plate attached to an outer side of the substrate between the RF and DC interfaces.

15. The module of claim 14 wherein the T/R signal channels include active circuit components and selected active circuit components are located in respective substrate cavities and mounted on the heat sink plate for waste heat dissipation.

16. The module of claim 15 wherein RF signals are isolated from one another by multiple enclosed and shielded cavities in the substrate.

* * * * *